(12) United States Patent
Ma et al.

(10) Patent No.: US 8,450,646 B2
(45) Date of Patent: May 28, 2013

(54) RETAINING HEAD AND CONTACT TIP FOR CONTROLLING WIRE CONTOUR AND CONTACTING POINT FOR GMAW TORCHES

(75) Inventors: Tiejun Ma, Windsor (CA); Paul-David Pinsonneault, St. Joachim (CA); Thomas Jaeger, Pointe Aux Roches (CA)

(73) Assignee: Illinois Tool Works Inc., Glenview, IL (US)

( * ) Notice: Subject to any disclaimer, the term of this patent is extended or adjusted under 35 U.S.C. 154(b) by 1406 days.

(21) Appl. No.: 12/125,369

(22) Filed: May 22, 2008

(65) Prior Publication Data

US 2009/0152255 A1    Jun. 18, 2009

Related U.S. Application Data

(60) Provisional application No. 61/014,470, filed on Dec. 18, 2007.

(51) Int. Cl.
*B23K 9/173*    (2006.01)

(52) U.S. Cl.
USPC ............. 219/137.61; 219/137.8; 219/137.31; 219/137.2; 219/136; 219/137.51; 219/137.43; 219/137.52

(58) Field of Classification Search
USPC ................. 219/137.61, 137.8, 137.31, 137.2, 219/136, 121.63, 137 R, 121.64, 121.76, 219/121.77
See application file for complete search history.

(56) References Cited

U.S. PATENT DOCUMENTS

| | | | | |
|---|---|---|---|---|
| 4,074,105 | A * | 2/1978 | Minehisa et al. | 219/137.8 |
| 4,450,341 | A * | 5/1984 | Dietrick et al. | 219/137.52 |
| 4,575,612 | A * | 3/1986 | Prunier | 219/137.43 |
| 4,731,518 | A * | 3/1988 | Parmelee et al. | 219/137.31 |
| 4,937,428 | A * | 6/1990 | Yoshinaka et al. | 219/137.52 |
| 5,440,100 | A * | 8/1995 | Stuart et al. | 219/137.31 |
| 5,726,420 | A * | 3/1998 | Lajoie | 219/137.61 |
| 6,075,227 | A * | 6/2000 | Lajoie | 219/137.61 |
| 6,200,519 | B1 * | 3/2001 | Wimroither | 266/66 |
| 6,462,309 | B1 * | 10/2002 | Wimroither | 219/137.51 |
| 6,708,864 | B2 * | 3/2004 | Ferguson et al. | 228/15.1 |
| 7,342,200 | B2 * | 3/2008 | Eberle | 219/137.31 |
| 7,381,923 | B2 * | 6/2008 | Gordon et al. | 219/137.61 |
| 7,557,327 | B2 * | 7/2009 | Matthews et al. | 219/137.61 |
| 7,663,074 | B2 * | 2/2010 | Wells | 219/137.31 |
| 2005/0218132 | A1 * | 10/2005 | Wells | 219/137.61 |

FOREIGN PATENT DOCUMENTS

| DE | 202 14 561 | 11/2002 |
|---|---|---|
| WO | 2007/068012 | 6/2007 |

OTHER PUBLICATIONS

Petra et al., Welding torch with a contact tip and a nozzle, Sep. 2002 (informal translation: DE20214561).*

* cited by examiner

*Primary Examiner* — Joseph M Pelham
*Assistant Examiner* — Jimmy Chou
(74) *Attorney, Agent, or Firm* — Fildes & Outland, P.C.

(57) ABSTRACT

A retaining head for a MIG welding device includes a contact tip mounting end, an opposite retaining head mounting end, and a throughbore extending from one of the ends to the other end. A deflector is disposed along the throughbore and is adjustable for imparting a bend in welding wire passing through the throughbore. The deflector provides a straight wire contour for the welding wire that is fed out of the welding torch, while maintaining sufficient contact force between the welding wire and the contact tip. The deflector also reduces the effect of wire twist on the contact point between the welding wire and the contact tip.

9 Claims, 5 Drawing Sheets

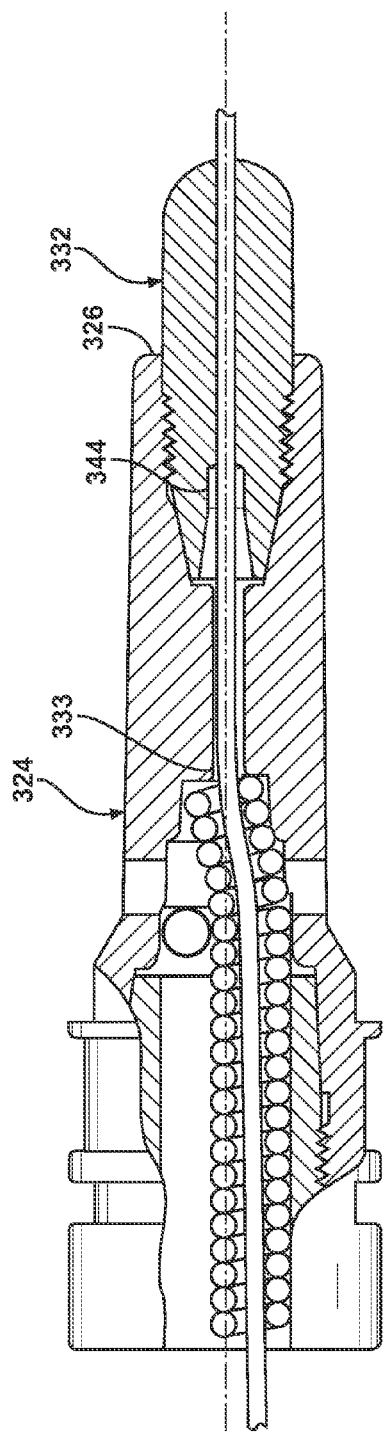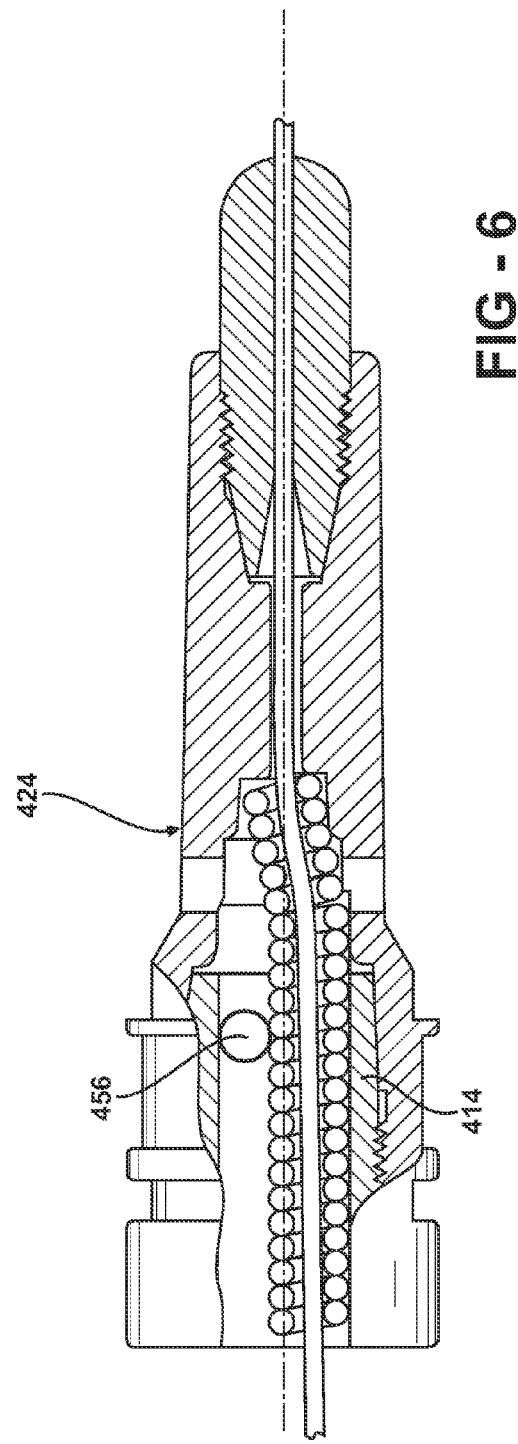

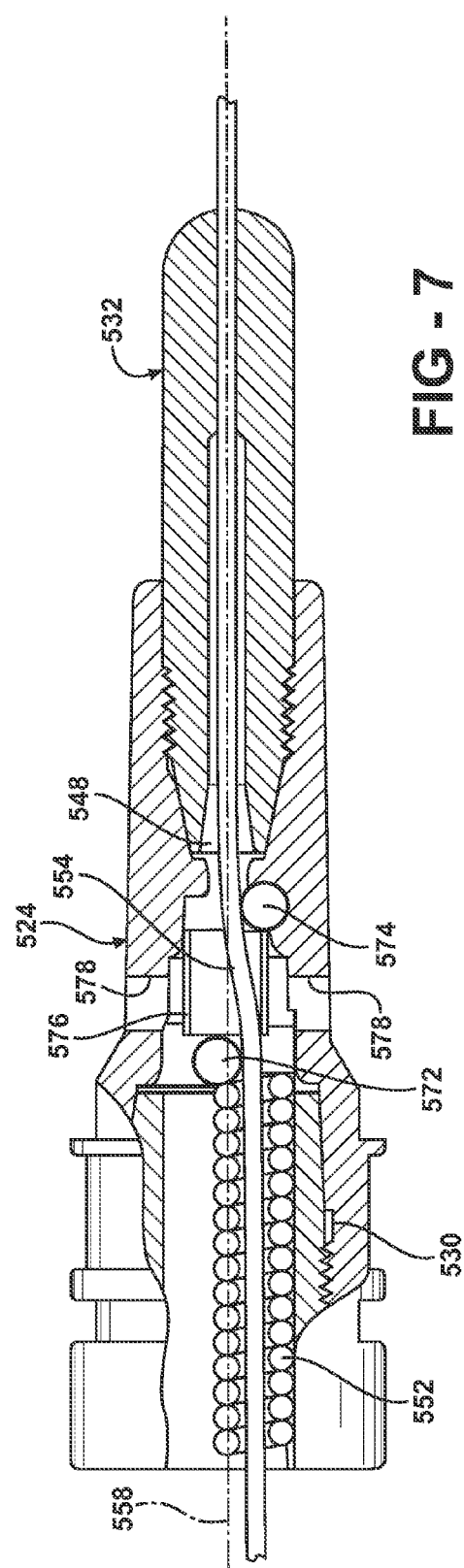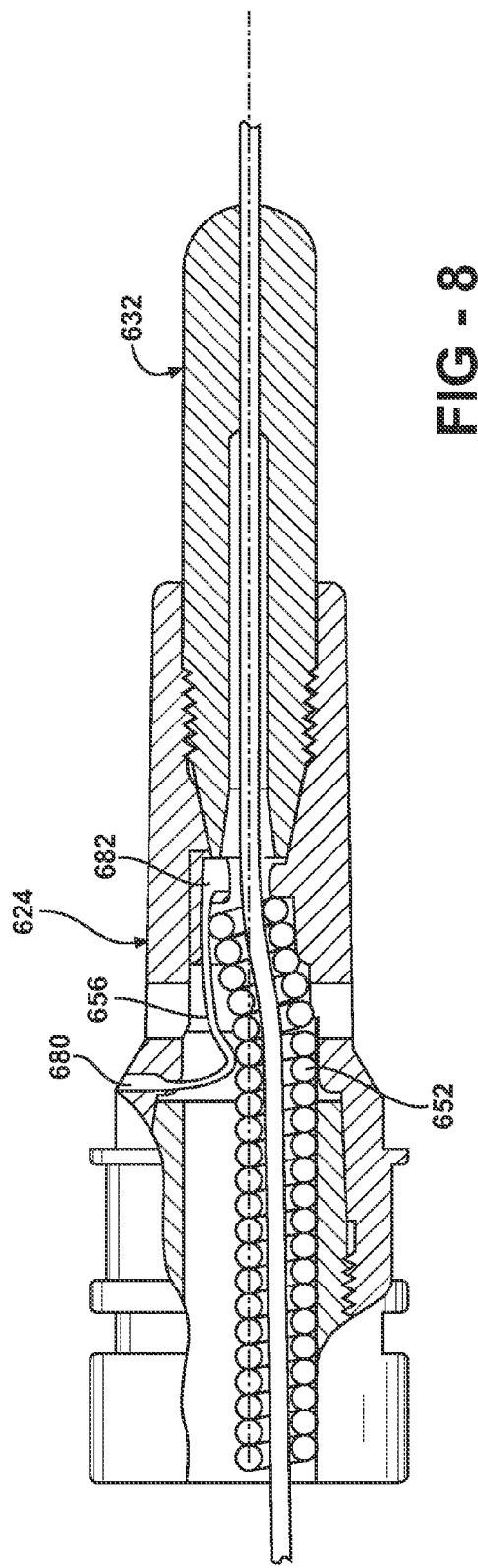

RETAINING HEAD AND CONTACT TIP FOR CONTROLLING WIRE CONTOUR AND CONTACTING POINT FOR GMAW TORCHES

CROSS REFERENCE TO RELATED APPLICATION

This application claims the priority of U.S. Provisional Application No. 61/014,470 filed Dec. 18, 2007.

TECHNICAL FIELD

This invention relates to goosenecks, retaining heads and contact tips of MIG (GMAW) guns or torches that are configured to bend welding (electrode) wire, thereby achieving straight contour of the welding wire when it is fed out of the contact tip and improving the contact between the welding wire and the contact tip.

BACKGROUND OF THE INVENTION

A common metal welding technique employs the heat generated by electrical arcing to transition a portion of a workpiece to a molten state, and the addition of filler metal from a welding wire. One technique that employs this arcing principle is wire-feed welding. Wire-feed welding involves routing welding current from a power source into an electrode that is brought into close proximity or contact with the workpiece. In typical wire-feed systems, electrode welding wire is directed through a welding cable, into a torch assembly, and particularly into a contact tip mounted to the torch assembly. Electrical current is routed from the welding cable to the welding wire through the contact tip. When a trigger on the welding torch is operated or an "on" signal is assigned by a robot/automatic controller, welding wire is advanced toward the contact tip, at which point current is conducted from the contact tip into the egressing welding wire. When the welding wire is sufficiently close to or touching the workpiece, current arcs from the welding wire to the workpiece, completing a circuit and generating sufficient heat to melt and weld the workpiece. Often, the welding wire is consumed and becomes part of the weld itself. Thus, new welding wire is advanced, continuously replacing the consumed welding wire and maintaining the welding arc. One common type of wire-feed welding is metal inert gas ("MIG") welding.

The use of high strength, low alloy steels has encouraged the development and application of new gas metal arc welding ("GMAW") processes such as pulse processes and modified short circuit processes. When welding thin sheet metal at a high speed, the welding arc is typically controlled to be "short, tight, and stiff," which corresponds to a low energy input. When a contact tip of a MIG torch is used and deteriorated, the energy transfer efficiency decreases. This results in lower energy (or voltage) being consumed at the arc. When the energy consumption is too low to maintain a smooth welding arc, stubbing occurs, which causes defects such as cold welding and discontinuous beads.

Increasing the contact force between the welding wire and the contact tip helps to ensure proper energy transfer efficiency. Two conventional methods to increase the contact force are increasing the wire cast (the curvature) through the use of a special jump liner inside the gooseneck, and bending the wire against the contact tip.

However, if the wire cast is too tight, the portion of wire that sticks out of the contact tip, between the contact tip and the arc, is significantly curved, causing misalignment issues. From a standpoint of application of the welding wire, it is desirable to have as straight a contour of welding wire as possible fed out of the contact tip. Hence, for a conventional MIG torch, improving the contact force and achieving straight wire contour are a pair of factors that are very difficult to balance.

Another factor that affects welding quality is wire twist. Due to the moving/rotating of a welding torch, the welding wire may flip or twist inside of the torch. This causes a sudden change in the contacting point between the welding wire and contact tip, and correspondingly causes fluctuation of the welding current and welding quality. It has been shown that the abovementioned method of bending the wire against the contact tip causes noticeable current fluctuation, especially when the wire cast is tight.

Therefore, a need exists for an improved assembly and method for controlling welding wire to achieve straight contour when the welding wire is fed out of a contact tip of a welding torch, and for maintaining sufficient contact force at a consistent point in the contact tip.

SUMMARY OF THE INVENTION

The present invention provides a gooseneck, retaining head and contact tip for controlling wire contour and contacting point for MIG (GMAW) torches. The present invention achieves straight welding wire contour when the welding wire is fed out of the contact tip. The present invention minimizes the effect of welding wire cast and wire twist on the contact point and contact force of welding wire against the contact tip. The present invention maintains the contact point between the welding wire and the contact tip when the welding wire flips inside a torch, maintaining a generally stable contact force between the welding wire and an exit end of the contact tip.

More particularly, a retaining head for a MIG welding device in accordance with the invention includes a contact tip mounting end, an opposite retaining head mounting end, and a throughbore extending from one of the ends to the other end. A deflector is disposed along the throughbore and imparts a bend in welding wire passing through the throughbore.

The throughbore may include a reduced diameter portion between the retaining head mounting end and the contact tip mounting end. A liner extending into the retaining head may be pushed away from a centerline of the throughbore by the deflector and guided back toward the centerline by the reduced diameter portion, thereby imparting a bend in welding wire fed through the liner.

Optionally, the deflector may be a set screw, a pin, a roller, an insert, and a spring guide. The deflector may be one of a pair of pins and a pair of rollers. The deflector may bend the welding wire at an obtuse angle.

In one embodiment, the retaining head may be disposed in combination with a contact tip having a mounting end, an opposite tip end, and a stepped throughbore extending between the mounting end and the tip end. The stepped throughbore is defined by a contact bore at the tip end and a spaced bore at the mounting end of a greater diameter than the contact bore at the tip end. The welding wire may contact the throughbore of the contact tip in the contact bore. The retaining head throughbore may include an extended spaced bore near the contact tip mounting end.

In another embodiment, an assembly for a welding torch in accordance with the invention includes a retaining head mountable on a welding torch. The retaining head has front and rear ends and a throughbore extending axially between the front and rear ends. The throughbore includes a reduced diameter portion between the front and rear ends. A deflector extends into the throughbore of the retaining head for contact with a liner of the welding torch. A contact tip is mounted in the retaining head throughbore and extends from the retaining head front end. The contact tip includes a body and a throughbore extending axially through the body. The throughbore has a wide diameter inlet, a large diameter portion adjacent the inlet, and a small diameter portion stepped from the large diameter portion. The deflector pushes the liner away from a centerline of the throughbore, and the liner is guided back toward the centerline by the reduced diameter portion of the retaining head throughbore, thereby imparting a bend in welding wire fed through the liner such that the welding wire is bent by the liner at two points and bent by the contact tip at one point in the small diameter portion.

Optionally, the deflector may bend the welding wire at an angle generally in the range of 4.5 to 6 degrees over a span of 0.5 to 0.8 inches. The deflector may be a set screw, a pin, a roller, an insert, or a spring guide. The deflector may be a pair of pins or a pair of rollers. The pair of pins or pair of rollers may directly guide the welding wire. The welding wire exiting from the contact tip may have a wire cast of 60 inches or more.

A method of advancing a welding wire through a MIG torch includes the steps of mounting a retaining head on a MIG torch, the retaining head having a contact tip mounting end, an opposite retaining head mounting end, a throughbore extending from one of the ends to the other end; disposing a deflector along the throughbore, the deflector imparting a bend in welding wire passing through the throughbore; feeding welding wire through the retaining head; and bending the welding wire.

Optionally, the method may include adjusting the deflector to bend the welding wire generally at an angle of 4.5 to 6 degrees. The method may include the step of mounting a contact tip on the retaining head, the contact tip having a mounting end, an opposite tip end, and a stepped throughbore extending between the mounting end and the tip end, the stepped throughbore being defined by a contact bore at the tip end and a spaced bore of a greater diameter than the contact bore at the tip end, wherein welding wire fed through the retaining head contacts the throughbore of the contact tip in the contact bore.

These and other features and advantages of the invention will be more fully understood from the following detailed description of the invention taken together with the accompanying drawings.

BRIEF DESCRIPTION OF THE DRAWINGS

In the drawings:

FIG. 5 is a sectional view of another alternative embodiment in which a spaced bore of the contact tip is replaced with a spaced bore of the retaining head;

FIG. 6 is a sectional view of yet another alternative embodiment in which a pin located in a gooseneck of the welding torch offsets the liner;

FIG. 7 is a sectional view of yet another alternative embodiment in which two pins directly bend the welding wire; and FIG. 8 is a sectional view of yet another alternative embodiment in which a spring guide offsets the liner.

DETAILED DESCRIPTION OF THE INVENTION

Figure 1:
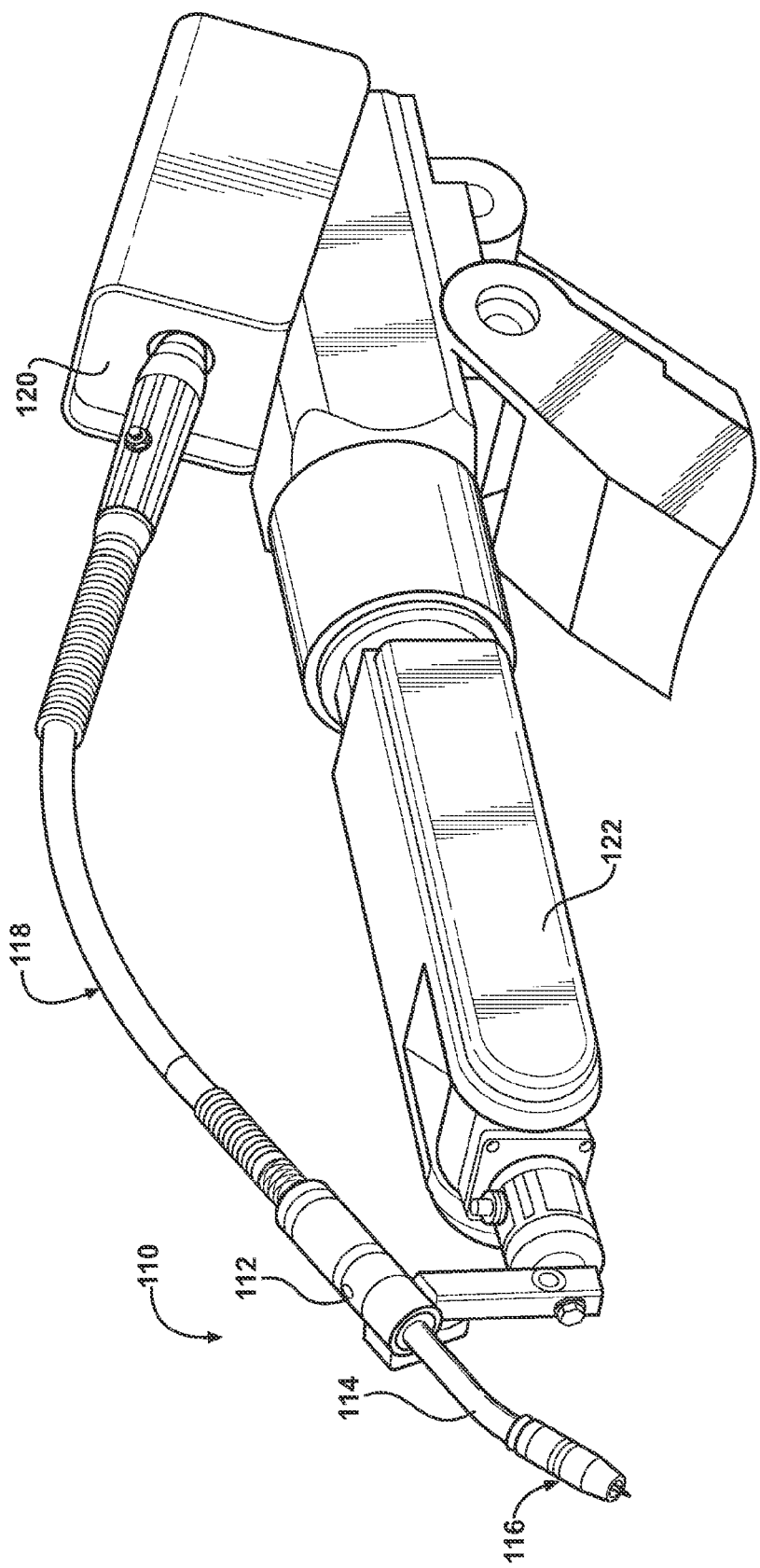
FIG. 1 is an environmental perspective view of a welding torch.

Referring now to the FIG. 1 in detail, numeral 110 generally indicates a welding device such as a gas metal arc welding (GMAW) torch, a metal inert gas (MIG) torch, or similar welding torch. The welding torch 110 broadly includes a main housing 112, a gooseneck 114, and a front end 116 including a contact tip and other components. A cable 118 is connected to a rearward end of the main housing 112 to supply gas, electrical current, and a consumable electrode (e.g., a metal welding wire) to the torch 110. The cable 118 may be connected to a wire feeder 120 opposite the main housing 112. The gooseneck 114 is operatively connected to a forward end of the main housing 112 and allows for the communication of the welding wire, the shielding gas, and the welding current to the contact tip mounted on the gooseneck through a retaining head. The welding torch 110 also may be mounted to a robotic arm 122.

The wire feeder 120 feeds the welding wire through the welding torch 110, and ultimately through an orifice in the contact tip at the front end 116 of the welding torch. The welding wire, when energized for welding, carries a certain electrical potential. When the welding wire approaches a target metal workpiece, an electrical arc is generated and maintained between the welding wire and the target metal workpiece. The arc melts the welding wire, creates a molten pool at the workpiece, and deposits the welding wire into the molten pool, thereby joining portions of the workpiece as the melt solidifies.

Figure 2:
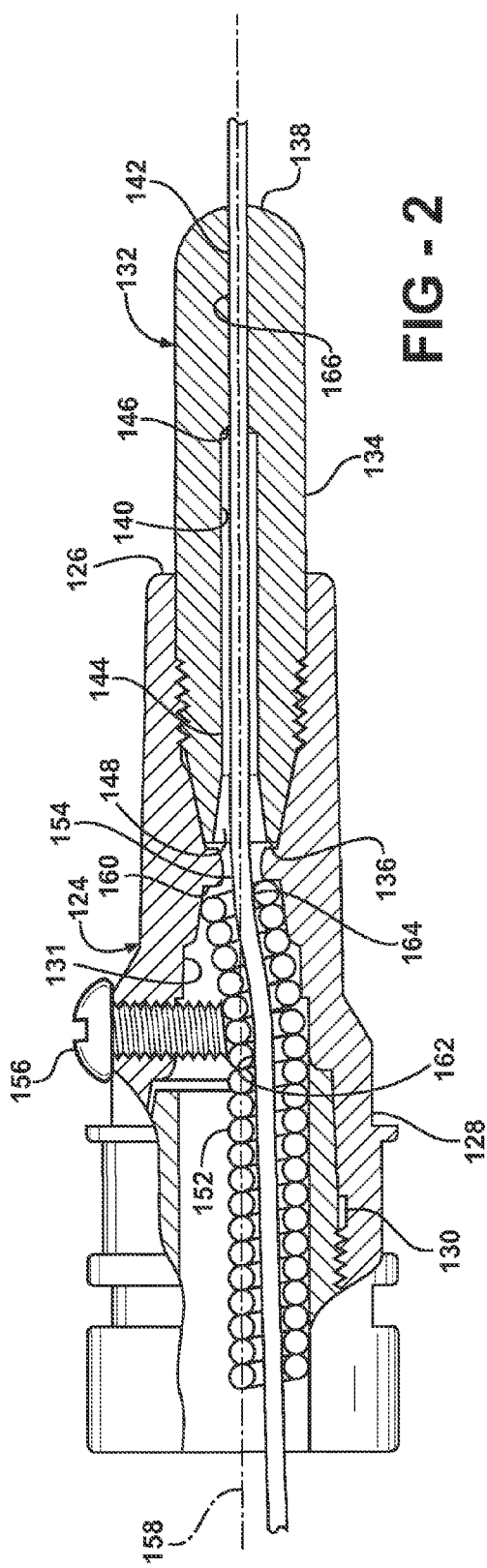
FIG. 2 is a sectional view of a retaining head and contact tip assembly in accordance with the invention, in which a set screw offsets a liner of the welding torch.

Turning to FIGS. 1 and 2, in a first embodiment of the invention, the front end 116 of the welding torch more specifically includes a retaining head 124 having a front, contact tip mounting end 126 and an opposite, retaining head mounting end 128 at its rear. The contact tip mounting end 126 is adapted to receive and mount a contact tip 132. A throughbore 130 extends axially from the contact tip mounting end 126 to the retaining head mounting end 128. The throughbore 130 includes a stepped or tapered reduced diameter portion 131 in which the diameter of the throughbore gradually decreases in a direction from the retaining head mounting end 128 to the contact tip mounting end 126. The diameter of the throughbore 130 in the reduced diameter portion 131 is smaller than the diameter of the throughbore 130 at the retaining head mounting end 128.

The contact tip 132 includes a body 134 having a mounting end 136 and an opposite tip end 138. A stepped throughbore 140 extends axially through the body 134 between the mounting end 136 and the tip end 138. The stepped throughbore 140 is defined by a "small diameter" contact bore 142 at the tip end 138 and a "large diameter" spaced bore 144 at the mounting end 136 that is of a greater diameter than the contact bore. A step 146 defines a boundary between the contact bore 142 and spaced bore 144. The throughbore 140 also includes a wide diameter inlet 148 adjacent the spaced bore 144. In one embodiment, the spaced bore 144 may have a diameter of 0.09-0.13 inches. The "small diameter" contact bore 142 may have a diameter that is approximately 8-20 percent larger than a diameter of welding wire 154 that is fed through the contact tip 132 (see FIG. 2). It should be understood, however, that other dimensions for the contact tip stepped throughbore 140 are within the scope of the invention.

The mounting end 136 of the contact tip 132 is insertable into the contact tip mounting end 126 of the retaining head 124. For example, an outer surface of the contact tip body 134 may include threads that cooperate with a threaded surface in the throughbore 130 of the retaining head 124.

The retaining head mounting end 128 of the retaining head 124 is generally mounted on the forward end of the gooseneck 114. A welding wire liner 152 such as a coil or similar extends from the gooseneck 114 into the throughbore 130 of the retaining head 124 at the retaining head mounting end 128. Welding wire 154 fed through the welding torch 110 passes through the liner 152 into the throughbore 140 of the contact tip 132 and exits from the contact tip stepped throughbore 140 at the tip end 138 of the contact tip.

The retaining head 124 further includes a deflector 156 disposed along and extending into the throughbore 130 that imparts a bend in the welding wire 154 passing through the throughbore of the retaining head. In this embodiment, the deflector 156 may be a set screw or a similar type of fastener that controls the contour of the liner 152 and thereby indirectly bends the welding wire 154. The deflector 156 contacts the liner 152, causing the liner to be offset from a centerline 158 (e.g., cylindrical axis) of the retaining head 124 and contact tip 132. As the liner 152 extends from the deflector 156 towards the contact tip mounting end 126, the liner is guided back to the centerline 158 of the throughbore 130 by the reduced diameter stepped portion 131 of the throughbore. As the liner 152 is guided back to the centerline of the retaining head 124, a portion of the liner between the deflector 156 and an end 160 of the reduced diameter stepped portion 131 of the retaining head is bent. The bend in the liner 152 in turn bends the welding wire 154. The bent welding wire 154 passes from the liner 152 into the retaining head throughbore 130, and from the retaining head throughbore 130 into the contact tip stepped throughbore 140.

The deflector 156 induces two bending points of the welding wire 154, and ensures the welding wire has a third bending point inside the contact tip 132, which is the only electrical contact point of the welding wire inside the front end 116 of the welding torch 110. The first bend point 162 of the welding wire 154 is located inside the liner 152, generally directly beneath a contact point of the deflector 156 on the liner. The second bend point 164 is located inside the liner 152, where the liner is guided to the centerline 158 of the retaining head throughbore 130. The second bend point 164 may usually be, though not necessarily, located at the last coil of the liner 152. The third bend point 166 is located inside the contact tip 132 at the small diameter portion 142. The third bend point 166 is also the only contact point between the welding wire 154 and the contact tip 132. The deflector 156 of the present invention has the following effects: (1) the welding wire 154 fed out of the contact tip 132 is relatively straight; for example, the wire cast is more than 60 inches in diameter; (2) the orientation of the third contact point 166 is fixed in a direction opposite to the pushing direction of the deflector; the original cast of the welding wire 154 and the wire twist has minimal affect on the third contact point 166; and (3) the contact force between the contact tip 132 and the welding wire 154 at the third contact point 166 is significantly higher than in conventional MIG torches, thus ensuring stable welding arc and long service lifespan of the contact tip.

For 0.035 to 0.045 inch (0.8 to 1.2 mm) diameter solid wire (copper coated or non-coated), the distance between the first and second bend points 162, 164 may be approximately 0.5-0.8 inches, and the angle of the welding wire bend in this section may be approximately 4.5-6 degrees. The length of the contact bore 142 of the contact tip 132 may be approximately 0.5-0.8 inches. Further, the distance from the second bend point 164 to an end of the contact bore 142 of the contact tip 132 may be approximately 0.5-0.8 inches.

Optionally, an inner surface of a front 0.1 to 0.9 inch portion (i.e., close to the contact tip 132) of the liner 152 may be extended 5 to 20 percent. This portion of the liner may be coated with a thin layer of graphite or boron nitride. The extension makes this portion of the liner easier to bend, and the coating reduces friction between the liner and the welding wire when the welding wire is fed through the liner, thus improving the wear resistance of the liner.

As shown in FIG. 2, due to the wide diameter of the inlet 148 as well as the "large" diameter of the spaced bore 144 of the contact tip throughbore 140, the welding wire does not touch, or barely has any contact with the inlet and spaced bore of the throughbore, and only contacts the contact tip in the "small diameter" contact bore 142 at the third bend point 166. The present invention thereby ensures that the contact force between the welding wire 154 and the contact tip 132 is maintained at the third bend point 166, and that proper energy transfer efficiency from the contact tip to the welding wire is maintained. For example, as the welding wire 154 is fed through the retaining head 124 and contact tip 132, the welding wire may rotate/flip within the contact tip. Since the spaced bore 144 of the contact tip 132 defines an open chamber, as the welding wire rotates, it does not contact the wall of the spaced bore and avoids being deflected from its contact point in the contact bore 142 at the third bend point 166.

Figure 3:
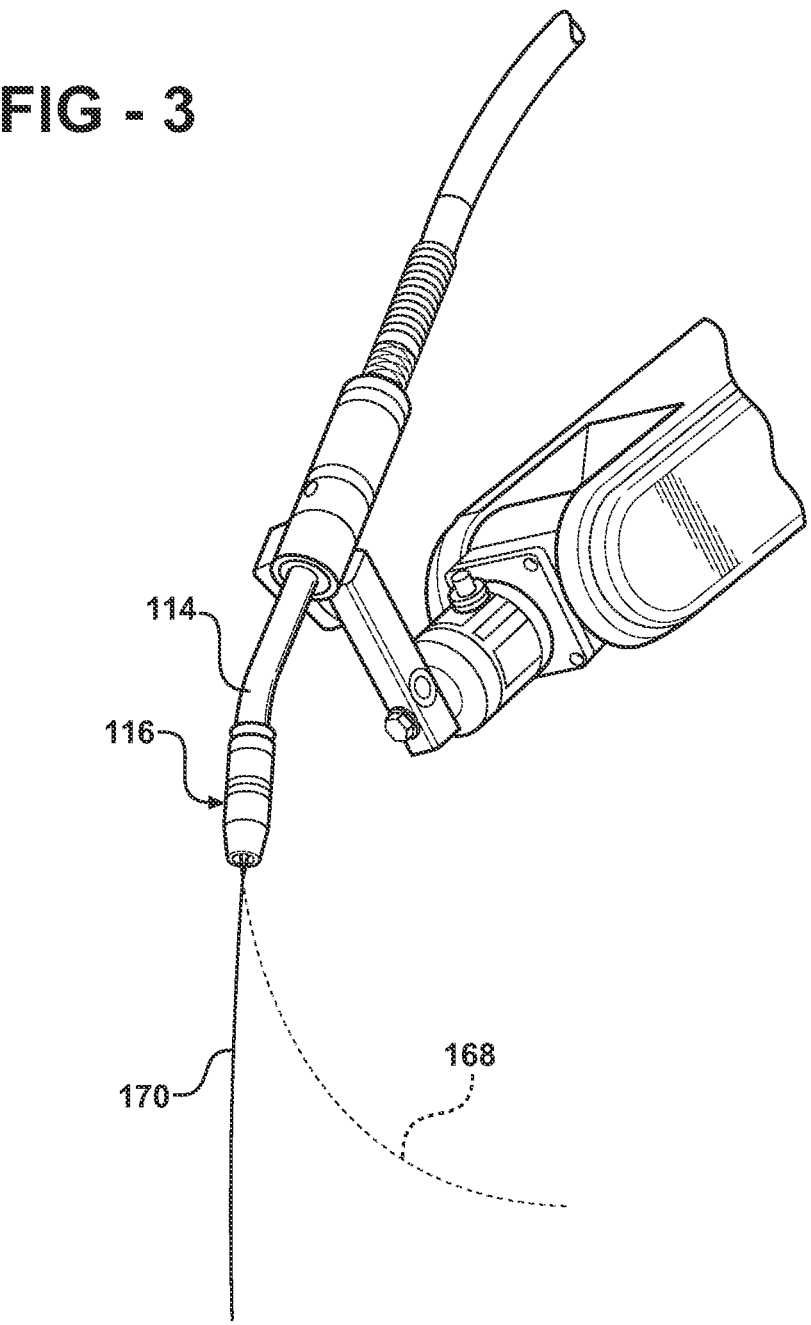
FIG. 3 is a schematic view illustrating the contour of a welding wire fed out of a conventional MIG torch in comparison to the contour of a welding wire fed out of a MIG torch in accordance with the invention.

Turning to FIG. 3, welding wire fed out of a conventional MIG torch almost keeps its original cast (curvature), which is shown schematically by line 168. The cast of the welding wire fed out of conventional torches can cause misalignment issues in some robotic welding applications, especially when the original wire cast is tight, such as 30 to 40 inches in diameter. In contrast, the wire cast of welding wire fed out of a torch having the gooseneck 114, retaining head and contact tip (front end 116) of the present invention is nearly straight, as shown by line 170.

Figure 4:
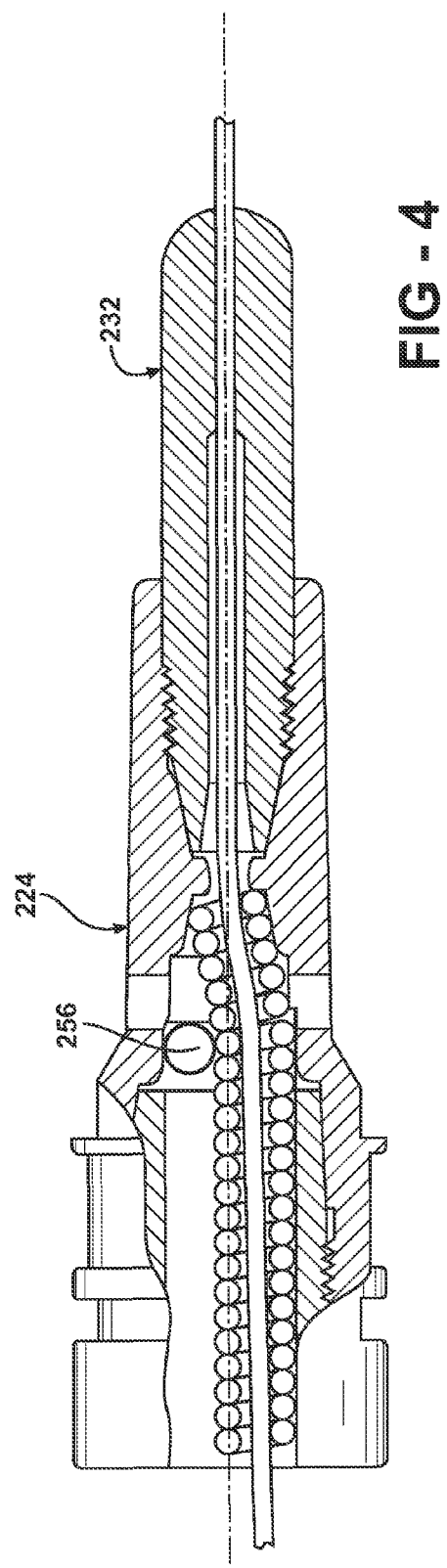
FIG. 4 is a sectional view of an alternative embodiment of the retaining head and contact tip assembly, in which a pin offsets the liner of the welding torch.

In a second embodiment shown in FIG. 4, the deflector 256 may be a pin that is mounted in the retaining head 224. The retaining head 224 and contact tip 232 otherwise may have features similar to the first embodiment. Alternatively, instead of a pin, the deflector may be a roller having a shape similar to the pin, or the deflector may be an insert. Also, the set screw (deflector 156) of the first embodiment may be disposed in the same orientation as pin (deflector 256) of FIG. 4.

In a third embodiment shown in FIG. 5, the throughbore of the retaining head 324 includes an extended spaced bore 333 near the contact tip mounting end 326 that achieves the same purpose as the spaced bore 144 of the first embodiment. The retaining head spaced bore 333 may be either long enough so that the contact tip spaced bore 344 may be eliminated, or a certain shorter length so that the contact tip 332 still has a portion of a spaced bore. For example, the extended spaced bore 333 may be 0.09 to 0.13 inches in diameter and 0.6 to 0.8 inches in length.

In a fourth embodiment shown in FIG. 6, the deflector 456 is disposed in the gooseneck 414 rather than the retaining head 424.

In a fifth embodiment shown in FIG. 7, the deflector includes a rear pin 572 and a front pin 574 disposed in the retaining head 524, and correspondingly the liner 552 is recessed behind the rear pin 572. Alternatively, the pins 572, 574 may be rollers. The pins 572, 574 are generally parallel to each other and perpendicular to the centerline 558 of the throughbore 530. The rear and front pins 572, 574 guide the contour of the welding wire 554 by directly contacting the welding wire. The distance between the pins 572, 574 may be approximately 0.5 to 0.8 inches, and the welding wire may be bent at an angle of approximately 4.5 to 6 degrees between the pins, thereby forming an obtuse angle. Optionally, a cylindrical tube 576 may be coaxially inserted into the throughbore 530 of the retaining head 524 and between the rear and front pins 572, 574. The tube 576 prevents welding spatter that comes through gas holes 578 from passing into the inlet 548 of the contact tip 532.

In a sixth embodiment shown in FIG. 8, the deflector 656 of the retaining head 624 may be a spring. In this embodiment, one end 680 of the spring 656 is fixed to the retaining head 624 while the other end 682 floats and extends towards the contact tip 632. The floating end 682 may engage the contact tip 632 that is inserted into the retaining head 624, and the contact tip may compress the spring 656, which engages and thereby bends the liner 652.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A retaining head for a MIG welding device, said retaining head comprising:
    a contact tip mounting end, an opposite retaining head mounting end, and a throughbore extending from said contact tip mounting end to said opposite retaining head mounting end, said throughbore including a reduced diameter portion between said retaining head mounting end and said contact tip mounting end;
    a liner extending into said retaining head;
    a deflector disposed along said throughbore for imparting a bend in said liner to bias said liner in part away from a centerline of said throughbore;
    said liner extends into said reduced diameter portion and is guided back toward said centerline by said reduced diameter portion, thereby imparting a bend in welding wire fed through said liner.

2. The retaining head of claim 1, wherein said deflector is one of a set screw, a pin, a roller, an insert, and a spring guide.

3. The retaining head of claim 1, wherein said deflector bends said welding wire at an obtuse angle.

4. The retaining head of claim 1 in combination with a contact tip having a mounting end and an opposite tip end;
    said contact tip having a stepped throughbore extending between said mounting end and said tip end;
    said stepped throughbore being defined by a contact bore at said tip end and a spaced bore at said mounting end of a greater diameter than said contact bore at said tip end.

5. The retaining head of claim 4, wherein said welding wire contacts said throughbore of said contact tip in said contact bore.

6. The retaining head of claim 1, wherein said retaining head throughbore includes an extended spaced bore near the contact tip mounting end.

7. An assembly for a welding torch, the assembly comprising:
    a retaining head mountable on a welding torch, said retaining head having front and rear ends and a throughbore extending axially between said front and rear ends;
    said throughbore including a reduced diameter portion between said front and rear ends;
    a deflector extending into said throughbore of said retaining head for contact with a liner disposed in said throughbore;
    a contact tip mounted in said retaining head throughbore and extending from said retaining head front end;
    said contact tip including a body and a throughbore extending axially through said body, said contact tip throughbore having a wide diameter inlet, a large diameter portion adjacent said inlet, and a small diameter portion stepped from said large diameter portion;
    said deflector pushing said liner away from a centerline of said retaining head throughbore, and said liner extending into said reduced diameter portion of said retaining head throughbore and being guided back toward said centerline by said reduced diameter portion of said retaining head throughbore, thereby imparting a bend in welding wire fed through said liner such that said welding wire is bent by said liner at two points and bent by said contact tip at one point in said small diameter portion.

8. The assembly of claim 7, wherein said deflector is one of a set screw, a pin, a roller, an insert, and a spring guide.

9. The assembly of claim 7, wherein the welding wire exiting from said contact tip has a wire cast of 60 inches or more.

* * * * *